UNITED STATES PATENT OFFICE.

PASCAL MARINO, OF LONDON, ENGLAND.

SECONDARY BATTERY.

1,023,861.   Specification of Letters Patent.   Patented Apr. 23, 1912.

No Drawing.   Application filed February 23, 1909. Serial No. 479,648.

*To all whom it may concern:*

Be it known that I, PASCAL MARINO, a subject of the King of Italy, residing at London, England, have invented new and useful Improvements in and Relating to Secondary Batteries, of which the following is a specification.

This invention relates to secondary or storage batteries, and consists in a process or method of manufacturing the electrodes therefor.

It comprises as its essential features: An agglutinant, which is a conductor of electric current, and which will not oxidize the supports of the electrodes, will not evaporate, and possesses a high adhesive property. A mixture which constitutes the active material or paste, and which will not shrink on drying. Treatment of the said mixture in such a manner as to render it porous. Conversion of the mixture into porous lead.

According to my invention, the mixture, with which the electrode is made, is composed of finely pulverized litharge, and of an agglutinant consisting of pure glycerin, soluble starch, and an alkaline silicate in solution, mixed with a certain proportion of impalpable lead powder. The said agglutinant, as before stated, neither oxidizes nor attacks the lead, has no tendency to evaporate, and when thoroughly mixed with finely ground litharge, forms an adhesive mixture which binds or adheres very tightly to the lead. This mixture will not shrink after solidifying. The adhesiveness which this agglutinant possesses not only renders the mixture or active material compact and solid, but cements it so firmly to the metallic supports (grids or plates), that both substances, viz: grids and active material, become, as it were, welded into one homogeneous substance, which will not disintegrate or become loosened by the electric action. The said mixture is further characterized by the fact that, under electric influence, it is easily and completely converted into porous lead.

It is well known that glycerin with sulfuric acid (glycero sulfuric acid) has been employed by itself to bind active materials, and that a solution of alkaline silicates has also been employed by itself for the same purpose; but these substances, so far as I am aware, have never been employed in combination with each other to bind the active material, as hereinafter particularly specified. To this end, I make use of the properties which the solutions of potassium and sodium silicates possess, not only as adhesives, but also as means for rendering organic matter, such as glycerin, uninflammable. Experiment has shown that if a few drops of pure glycerin be poured upon a peroxidized positive plate of such an element as lead, an explosion takes place and the glycerin ignites, whereas if glycerin be mixed with a solution of silicate of potassium, or sodium, it is rendered uninflammable, hence the positive electrode, constituted by this agglutinative mixture of glycerin with the addition of a solution of silicate of potassium or sodium, is rendered non-explosive. The adhesiveness of the agglutinant is materially increased by the addition of the silicate of potassium, or sodium, to the glycerin, and a good contact is thus assured between the mixture or paste and the surfaces of the grids or plates which distribute the electric current into and through the active material of the electrodes.

It is well known that a combination of litharge and glycerin forms one of the best known cements, but, nevertheless, this combination, by itself, is wholly unsuitable for the formation of good electrodes, as it produces a very hard and impervious substance or composition which precludes the possibilities of the essential qualities of a good paste, viz: that of porosity, which is absolutely necessary to permit the electrolyte to thoroughly permeate the active material, and so increase its superficial area, and thereby its capacity and efficiency, as also its retentivity for the gases generated.

For the purpose of decomposing and precipitating out the silica contained in the alkaline silicates, I employ sulfuric and phosphoric acids, so rendering the combination of glycerin and litharge porous and pervious to the gases and the electrolyte, and I add to said combination a solution of alkaline silicate, starch, and finely pulverized lead. The electrodes, after having been pasted and dried, are dipped into the solution so as to precipitate out the silica contained in the alkaline silicate, which combines with the acid to form silicic acid, the alkaline silicate having formed one of the constituents for the active material.

I will now proceed to describe an example of the manufacture of an electrode of my lead accumulator.

*Agglutinant.*—The agglutinant is composed of pure glycerin of a sp. gr. of 1.26, soluble starch, and a 20% alkaline silicate solution, the proportions varying according to whether it is desired, in the process of manufacture, or pasting, to have a very stiff, or a semi liquid, mixture of active material. By way of example, the following mixture may be employed: 2 parts pure glycerin, 1 part solution of alkaline silicate, such as potassium silicate, and 2% soluble starch, the said mixture being well stirred until there are no lumps. Impalpable lead powder is then added in the proportion of ⅓ of the weight of the litharge employed, for the purpose of rendering the agglutinant conductive to the electric current, and the mass is then thoroughly mixed and kneaded into a homogeneous paste.

*Mixture.*—I take finely divided litharge and mix and thoroughly work it up with the agglutinant, prepared as above described, until I obtain a homogeneous mass of the required consistency. The agglutinant, or agglutinative liquid, enters into combination with the litharge and binds the mixture, so forming a cohesive and homogeneous mixture of a somewhat sticky and glutinous character. This mass, according to its consistency, is either poured or spread, on to the grids or strips of metal it is intended to use as electrodes.

*Precipitation of the silica from the solution of alkaline silicate.*—When the active material of the electrodes has quite solidified and dried, the electrodes are immersed in a bath composed of equal parts of sulfuric acid of a sp. gr. of 1.025, and phosphoric acid of a sp. gr. of 1.12 in order to precipitate out the silica from the solution of alkaline silicate, which combines with the acid to form silicic acid, the mixture of these two acids being employed to avoid any preliminary formation of sulfate of lead. The electrodes are then washed in running water, so as to thoroughly remove the precipitated silica, the soluble starch and any alkaline sulfo-phosphate (potassium) which may have formed. By the removal of these substances, in the manner described, I obtain an electrode, the active material of which is full of innumerable imperceptible pores or microscopic cells, and this porosity enables the electrolyte to easily penetrate and gain access to every particle of the active material; the superficial area of the electrode is, in this way, enormously increased and consequently its efficiency and capacity also.

*Conversion of the active material of the electrodes into porous lead.*—I arrange all the electrodes as cathodes in a suitable tank, and for anodes I employ counter or dummy electrodes composed of pure lead of about 2 or 3 mm. in thickness, after which, dilute sulfuric acid, of the recognized density, is introduced into the tanks, and then, by means of an electric current, of suitable voltage and amperage, the active material of these electrodes is completely transformed into porous lead. As soon as the electrodes are transformed, they are withdrawn from the tanks and thoroughly washed, and are then ready for the second or final process of formation.

*Manufacture of the accumulator.*—The electrodes already described above under the heading of conversion, as having been completely converted into porous lead, are now connected up alternately, in the usual way, with a separator between each (preferably that described in my specification, Serial No. 479,649, filed 23rd February 1909), and placed in the cells which they are finally to occupy; the cells are then charged with dilute sulfuric acid, and the electric current applied, and, in this way, the said electrodes are converted into positive and negative plates, respectively, or reservoirs for the storage of electric energy. In the process of formation through the action of the electric current, oxygen is disengaged upon the porous lead of one pole, and combines with the lead to form peroxid of lead (positive pole).

*The effect or result of the reversal of polarity.*—The reversal of polarity is applicable to this electrode, owing to the molecular compactness of the active material or paste produced by the combination of the agglutinant with the litharge, and to the intimate contact which exists between the active material and the metallic supports. The change of polarity enables the active materials to be regenerated and restores to them their original energy and capacity.

Having now described my invention, I claim:

1. Active material for electrodes for storage batteries made from pure glycerin, a solution of alkaline silicate, a small quantity of soluble starch, and impalpable lead powder, the whole being thoroughly incorporated together into a homogeneous mass.

2. Active material for electrodes for storage batteries made from finely pulverized litharge, and an agglutinant composed of pure glycerin, a solution of alkaline silicate and soluble starch, and mixed with impalpable lead powder.

3. Material for conversion into a negative or spongy lead electrode for storage batteries, comprising: an adhesive agglutinant, which is a conductor of electric current, and consisting of pure glycerin, soluble starch, an alkaline silicate, and an impalpable lead powder, and an active material consisting of finely divided litharge combined with the aforesaid agglutinant.

In witness whereof, I have hereunto signed my name in the presence of two subscribing witnesses.

PASCAL MARINO.

Witnesses:
 H. D. JAMESON,
 F. L. RAND.